United States Patent
Bhagat

(10) Patent No.: US 9,864,661 B2
(45) Date of Patent: Jan. 9, 2018

(54) CACHE-ACCELERATED REPLICATION OF SNAPSHOTS BETWEEN STORAGE DEVICES

(71) Applicant: HEWLETT PACKARD ENTERPRISE DEVELOPMENT LP

(72) Inventor: Nimesh Bhagat, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 2 days.

(21) Appl. No.: 15/043,417

(22) Filed: Feb. 12, 2016

(65) Prior Publication Data

US 2017/0235646 A1    Aug. 17, 2017

(51) Int. Cl.
   *G06F 12/00*    (2006.01)
   *G06F 13/00*    (2006.01)
   (Continued)

(52) U.S. Cl.
   CPC ...... *G06F 11/1464* (2013.01); *G06F 12/0813* (2013.01); *G06F 12/0888* (2013.01);
   (Continued)

(58) Field of Classification Search
   CPC ........ G06F 3/06; G06F 3/0602; G06F 3/0604; G06F 3/0608; G06F 3/061; G06F 3/0611; G06F 3/0613; G06F 3/0619; G06F 3/062; G06F 3/0622; G06F 3/0625; G06F 3/0628; G06F 3/0629; G06F 3/0631; G06F 3/0632; G06F 3/0634; G06F 3/0635; G06F 3/0637; G06F 3/064; G06F 3/0641; G06F 3/0646; G06F 3/0647; G06F 3/065; G06F 3/0652; G06F 3/0653; G06F 3/0655; G06F 3/0662; G06F 3/0664; G06F 3/0665;
   (Continued)

(56) References Cited

U.S. PATENT DOCUMENTS 7,484,062 B2 *  1/2009  Arimilli ............... G06F 9/30032
                                                    711/118
8,788,628 B1 *  7/2014  Taylor ............... G06F 17/30194
                                                    709/219

(Continued)

OTHER PUBLICATIONS

The Fundamentals of Cache; Paul Mazzucco; Jun. 26, 2012; retrieved from https://web.archive.org/web/20120626105738/http://dewassoc.com/performance/memory/cache_explained.htm on Apr. 15, 2016 (11 pages).*

*Primary Examiner* — Daniel C Chappell

(57) ABSTRACT

Methods, systems, and computer programs are presented for replicating snapshot data between network storage devices. One method includes an operation for detecting a read request for a data block of a volume in a storage device, the volume being stored in disk storage and cached in cache memory. The data block is read from the cache memory if the data block is in the cache memory, otherwise, the data block is read from the disk storage. When the data block is not stored in the cache memory and the read request is not for replicating the data block to a another storage device, the data block read from the disk storage is cached in the cache memory. However, the data block is not cached in the cache memory when the data block is being replicated to the other storage device. Afterwards, the read request is completed.

8 Claims, 8 Drawing Sheets

(51) Int. Cl.
*G06F 13/28* (2006.01)
*G06F 11/14* (2006.01)
*G06F 12/0813* (2016.01)
*G06F 12/0888* (2016.01)

(52) U.S. Cl.
CPC .... *G06F 2201/84* (2013.01); *G06F 2212/154* (2013.01); *G06F 2212/60* (2013.01)

(58) Field of Classification Search
CPC ...... G06F 3/0667; G06F 3/0668; G06F 3/067; G06F 3/0671; G06F 3/0683; G06F 3/0685; G06F 3/0686; G06F 3/0688; G06F 3/0689; G06F 11/14; G06F 11/1402; G06F 11/1405; G06F 11/1415; G06F 11/1435; G06F 11/1446; G06F 11/1448; G06F 11/1451; G06F 11/1453; G06F 11/1458; G06F 11/1469; G06F 11/2053; G06F 11/2056; G06F 11/2089; G06F 11/2094; G06F 17/3007; G06F 17/30073; G06F 17/30076; G06F 17/30079; G06F 17/30082; G06F 17/30088; G06F 17/30091; G06F 17/301; G06F 17/30115; G06F 17/30129; G06F 17/30132; G06F 17/30138; G06F 17/30; G06F 17/147; G06F 17/30159; G06F 17/30194; G06F 17/30197; G06F 17/302; G06F 17/30203; G06F 17/30206; G06F 17/30212; G06F 17/30215; G06F 17/30286; G06F 17/30289; G06F 17/30303; G06F 17/30309; G06F 17/30312; G06F 17/30557; G06F 17/30575; G06F 17/30578; G06F 17/30581; G06F 17/30584; G06F 2003/0691; G06F 2003/0692; G06F 2003/0694; G06F 2003/0695; G06F 2003/0697; G06F 2003/0698; G06F 2201/84; G06F 2201/845; G06F 2201/85; G06F 2201/855; G06F 2201/88; G06F 2201/885; G06F 2212/00; G06F 2212/10; G06F 2212/1016; G06F 2212/1021; G06F 2212/1024; G06F 2212/1028; G06F 2212/1032; G06F 2212/1041; G06F 2212/1048; G06F 2212/20; G06F 2212/21; G06F 2212/22; G06F 2212/221; G06F 2212/222; G06F 2212/224; G06F 2212/225; G06F 2212/25; G06F 2212/251; G06F 2212/253; G06F 2212/26; G06F 2212/261; G06F 2212/262; G06F 2212/263; G06F 2212/27; G06F 2212/271; G06F 2212/272; G06F 2212/28; G06F 2212/281; G06F 2212/282; G06F 2212/283; G06F 2212/285; G06F 2212/30; G06F 2212/304; G06F 2212/305; G06F 2212/306; G06F 2212/31; G06F 2212/311; G06F 2212/312; G06F 2212/313; G06F 2212/314; G06F 2212/40; G06F 2212/45; G06F 2212/46; G06F 2212/461; G06F 2212/462; G06F 2212/463; G06F 2212/464; G06F 2212/465; G06F 2212/466; G06F 2212/468; G06F 2212/50; G06F 2212/502; G06F 2212/507; G06F 2212/60; G06F 2212/601; G06F 2212/602; G06F 2212/6022; G06F 2212/6024; G06F 2212/6026; G06F 2212/6028; G06F 2212/603; G06F 2212/6032; G06F 2212/604; G06F 2212/6042; G06F 2212/6046; G06F 2212/608; G06F 2212/6082; G06F 2212/62; G06F 2212/621; G06F 2212/622; G06F 2212/69; G06F 2212/70; G06F 2212/702; G06F 2212/72; G06F 2212/7201–2212/7209; G06F 2212/7211
See application file for complete search history.

(56) References Cited

U.S. PATENT DOCUMENTS

| | | | | |
|---|---|---|---|---|
| 9,058,123 | B2* | 6/2015 | Joshi | G06F 12/0866 |
| 9,612,966 | B2* | 4/2017 | Joshi | G06F 12/0875 |
| 2005/0138289 | A1* | 6/2005 | Royer, Jr. | G06F 12/0866 |
| | | | | 711/118 |
| 2005/0210193 | A1* | 9/2005 | Nagata | G06F 11/1435 |
| | | | | 711/114 |
| 2009/0019229 | A1* | 1/2009 | Morrow | G06F 12/0862 |
| | | | | 711/137 |
| 2015/0356110 | A1* | 12/2015 | Lin | G06F 17/30171 |
| | | | | 707/704 |
| 2015/0356116 | A1* | 12/2015 | Lin | G06F 17/30212 |
| | | | | 707/613 |
| 2015/0370827 | A1* | 12/2015 | Parkison | G06F 17/30215 |
| | | | | 707/626 |
| 2016/0004718 | A1* | 1/2016 | Lin | G06F 17/30171 |
| | | | | 707/690 |
| 2016/0124652 | A1* | 5/2016 | Adamson | G06F 17/30312 |
| | | | | 711/171 |
| 2016/0342357 | A1* | 11/2016 | Ramamoorthy | G06F 3/0631 |

* cited by examiner

US 9,864,661 B2

CACHE-ACCELERATED REPLICATION OF SNAPSHOTS BETWEEN STORAGE DEVICES

BACKGROUND

1. Field of the Invention

The present embodiments relates to methods, systems, and programs for improving the performance when replicating data from a storage device to another storage device.

2. Description of the Related Art

Network storage, also referred to as network storage systems or storage systems, is computer data storage connected to a computer network providing data access to heterogeneous clients. Typically, network storage systems process a large amount of Input/Output (IO) requests, and to process these IO requests efficiently, the network storage systems must have high availability, speed, and reliability.

Sometimes data is copied from one system to another, such as when an organization upgrades to a new data storage device, when backing up data to a different location, or when backing up data for the purpose of disaster recovery. The data needs to be migrated or replicated to the new device from the old device.

Typically, replication has been a background job because most system administrators have been replicating volumes about once a day. Therefore, replication has not been a performance-critical operation. However, many data storage administrators are increasing dramatically the number of replications performed on data, sometimes replicating thousands of volumes a day multiple times. This means that the replication has to be efficient or the performance of the storage array for processing IOs will degrade.

Further, the problem of efficient replication is sometimes compounded when a volume has a large number of randomly written data, because replicating random data requires more computing resources. For example, as a volume grows, the volume metadata related to stored blocks grows, and finding which blocks to replicate becomes increasingly more expensive as a result of the volume metadata growth.

What is needed is a network storage device, software, and systems that efficiently replicate large amounts of data between systems without impacting the normal operation of the storage device.

It is in this context that embodiments arise.

SUMMARY

Methods, devices, systems, and computer programs are presented for replicating snapshot data between network storage devices. It should be appreciated that the present embodiments can be implemented in numerous ways, such as a method, an apparatus, a system, a device, or a computer program on a computer readable medium. Several embodiments are described below.

One general aspect includes a method for managing memory utilization. The method includes an operation for detecting a read request for a data block of a volume in a first storage device, where the volume is stored in disk storage and cached in cache memory. The method also includes operations for reading the data block from the cache memory when the data block is stored in the cache memory, and for reading the data block from the disk storage when the data block is not stored in the cache memory. Further, the data block read from the disk storage is cached in the cache memory when the data block is not stored in the cache memory and the read request is not for replicating the data block to a second storage device. However, the data block is not cached in the cache memory when replicating the data block. The method also includes an operation for completing the read request.

One general aspect includes a network storage device that includes a random access memory (RAM), disk storage for storing data of a volume, a cache memory for caching the data of the volume, and a processor. The processor is configured to detect a read request for a data block of the volume, where the processor reads the data block from the cache memory when the data block is stored in the cache memory. When the data block is not stored in the cache memory, the processor reads the data block from the disk storage, and when the data block is not stored in the cache memory and the read request is not for replicating the data block to another storage device, the processor caches the data block read from the disk storage in the cache memory. The data block is not cached in the cache memory when replicating the data block. The processor completes the read request after reading the data block from the cache memory or from the disk storage.

One general aspect includes a non-transitory computer-readable storage medium storing a computer program for managing memory utilization, the computer-readable storage medium including program instructions for detecting a read request for a data block of a volume in a first storage device. The volume is stored in disk storage and cached in cache memory. The storage medium also includes program instructions for reading the data block from the cache memory when the data block is stored in the cache memory. When the data block is not stored in the cache memory, the data block is read from the disk storage. When the data block is not stored in the cache memory and the read request is not for replicating the data block to a second storage device, the data block read from the disk storage is cached in the cache memory, where the data block is not cached in the cache memory when replicating the data block. The storage medium also includes program instructions for completing the read request. Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

Common snapshot replication implementations do not use the cache for replication, as traditionally replication has been a process run with low frequency and the probability of finding data of a snapshot in cache has been low. In one embodiment, the replication of a snapshot is based on the replication of a previously replicated snapshot, and the replication operation includes transferring only the changes between snapshots.

In another embodiment, snapshot metadata is pinned to cache, so the metadata is easily accessible to determine whether the blocks needed for replication are available in cache. If the data blocks are not available in cache, then the system reads the data blocks from disk. Traditionally, when a data read requires accessing disk, the data is cached after being read from the disk.

In one embodiment, when a read to cache is a miss, the system will read from disk. However, during the read from disk, the data read from disk for replication is not stored to cache, although the data read from disk for regular IO operations is still cached. This reduces or eliminates cache pollution caused by replication.

In another aspect, replication includes pre-fetching data from disk and saving it in a cache memory, such as a RAM cache or an SSD cache. Thus, when a block of data is requested from disk, the system will pre-fetch several data blocks following (or around the address of) the requested data block. Now, when the next block is requested, the pre-fetch data will be quickly made available. This avoids a new read from disk.

The following embodiments describe methods, devices, systems, and computer programs for replicating snapshot data between network storage devices. It will be apparent, that the present embodiments may be practiced without some or all of these specific details. In other instances, well-known process operations have not been described in detail in order not to unnecessarily obscure the present embodiments.

Figure 1:
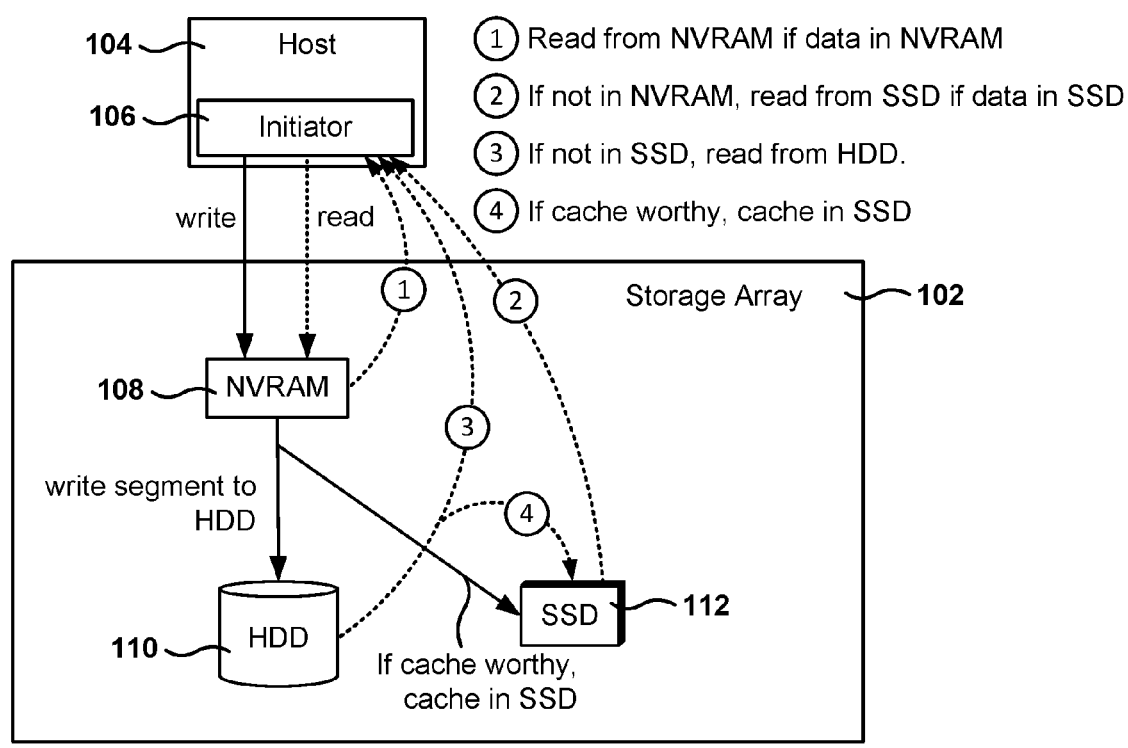
FIG. 1 illustrates the read and write paths within the storage array, according to one embodiment.

FIG. 1 illustrates the read and write paths within the storage array 102, according to one embodiment. The storage array 102 is also referred to herein as a networked storage device or a storage system. In the example architecture of FIG. 1, a storage array 102 provides storage services to one or more servers 104 (which are referred to herein as hosts) and to one or more clients (not shown). Storage array 102 includes non-volatile RAM (NVRAM) 108, one or more hard disk drives (HDD) 110, and one or more solid state drives (SSD) 112, also referred to herein as flash cache.

NVRAM 108 stores the incoming data as the data arrives to the storage array. After the data is processed (e.g., compressed and organized in segments (e.g., coalesced)), the data is transferred from the NVRAM 108 to HDD 110, or to SSD 112, or to both.

The host 104 includes one or more applications and a computer program named initiator 106 that provides an interface for accessing storage array 102 to the applications running in host 104. When an IO operation is requested by one of the applications, initiator 106 establishes a connection with storage array 102 in one of the supported formats (e.g., iSCSI, Fibre Channel, or any other protocol).

Regarding the write path, the initiator 106 in the host 104 sends the write request to the storage array 102. As the write data comes in, the write data is written into NVRAM 108, and an acknowledgment is sent back to the initiator 106 (e.g., the host or application making the request). In one embodiment, storage array 102 supports variable block sizes. Data blocks in the NVRAM 108 are grouped together to form a segment. In one embodiment, the segment is compressed and then written to HDD 110.

In addition, if the segment is considered to be cache-worthy (e.g., important enough to be cached or likely to be accessed again) the segment is also written to SSD 112. In one embodiment, the segment is written (i.e., cached) to the SSD 112 in parallel while the segment is written to HDD 110.

With regards to the read path, the initiator 106 sends a read request to storage array 102. The requested data may be found in any of the different levels of storage mediums of the storage array 102. First, a check is made to see if the data is found in the NVRAM 108, and if the data is found in the NVRAM 108 then the data is read from the NVRAM 108 and sent back to the initiator 106. In one embodiment, a shadow RAM memory (not shown) (e.g., DRAM) keeps a copy of the data in the NVRAM and the read operations are served from the shadow RAM memory. When data is written to the NVRAM, the data is also written to the shadow RAM so the read operations can be served from the shadow RAM leaving the NVRAM free for processing write operations.

If the data is not found in the NVRAM 108 (or the shadow RAM) then a check is made to determine if the data is in SSD 112, and if so (i.e., a cache hit), the data is read from the SSD 112 and sent to the initiator 106. If the data is not found in the NVRAM 108 or in the SSD 112, then the data is read from the hard drives 110 and sent to initiator 106. In addition, if the data being served from hard disk 110 is cache worthy, then the data is also cached in SSD 112.

Figure 2:
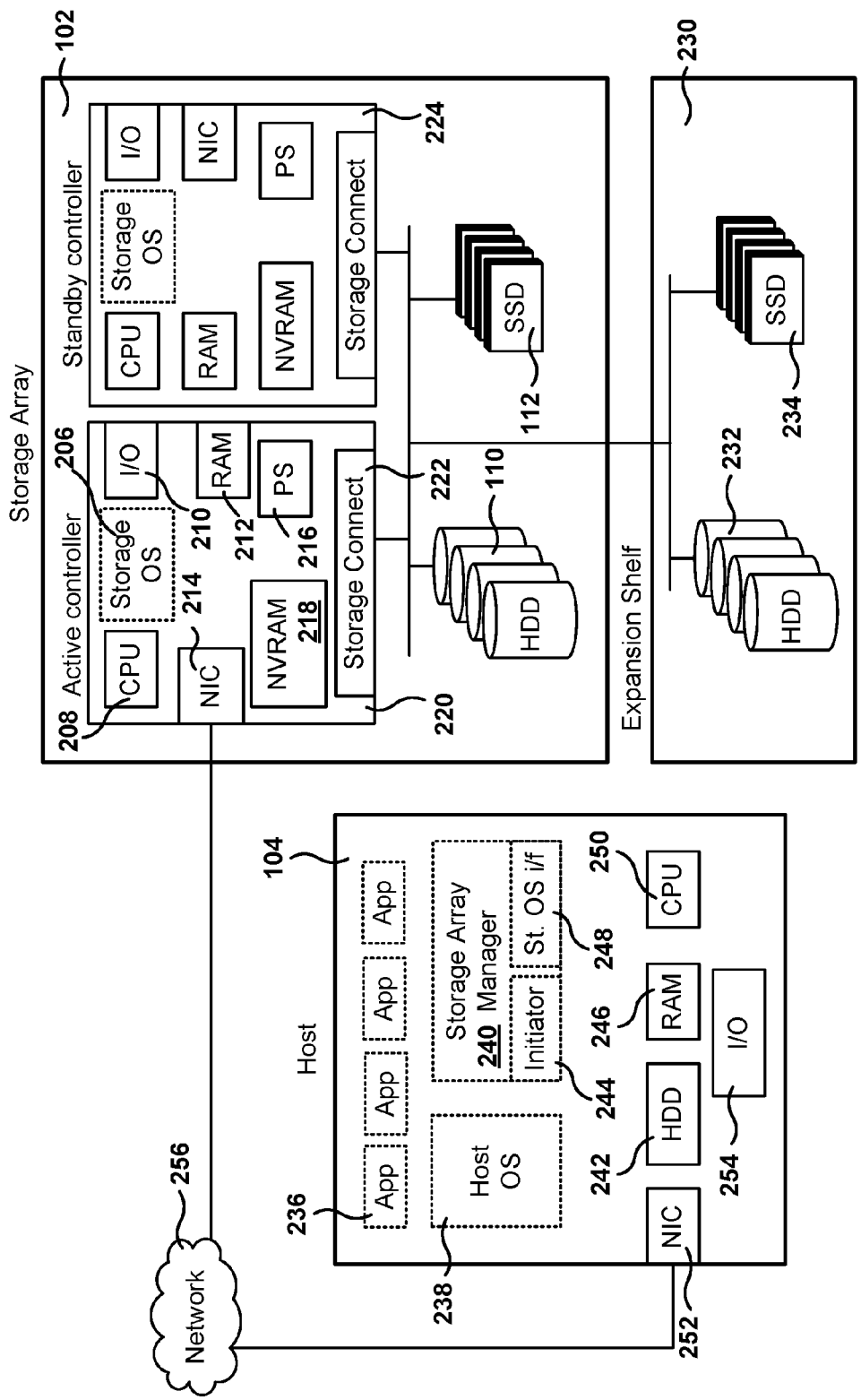
FIG. 2 illustrates an example architecture of a storage array 102, according to one embodiment.

FIG. 2 illustrates an example architecture of a storage array 102, according to one embodiment. In one embodiment, storage array 102 includes an active controller 220, a standby controller 224, one or more HDDs 110, and one or more SSDs 112. In one embodiment, the controller 220 includes non-volatile RAM (NVRAM) 218, which is for storing the incoming data as it arrives to the storage array. After the data is processed (e.g., compressed and organized in segments (e.g., coalesced)), the data is transferred from the NVRAM 218 to HDD 110, or to SSD 112, or to both.

In addition, the active controller 220 further includes CPU 208, general-purpose RAM 212 (e.g., used by the programs executing in CPU 208), input/output module 210 for communicating with external devices (e.g., Universal Serial Bus (USB) port, terminal port, connectors, plugs, links, etc.), one or more network interface cards (NICs) 214 for exchanging data packages through network 256, one or more power supplies 216, a temperature sensor (not shown), and a storage connect module 222 for sending and receiving data to and from the HDD 110 and SSD 112. In one embodiment, the NICs 214 may be configured for Ethernet communication or Fibre Channel communication, depending on the hardware card used and the storage fabric. In other embodiments, the storage array 102 may be configured to operate using the iSCSI transport or the Fibre Channel transport.

Active controller 220 is configured to execute one or more computer programs stored in RAM 212. One of the computer programs is the storage operating system (OS) used to perform operating system functions for the active controller device. In some implementations, one or more expansion shelves 230 may be coupled to storage array 102 to increase HDD 232 capacity, or SSD 234 capacity, or both.

Active controller 220 and standby controller 224 have their own NVRAMs, but they share HDDs 110 and SSDs 112. The standby controller 224 receives copies of what gets stored in the NVRAM 218 of the active controller 220 and stores the copies in its own NVRAM. If the active controller 220 fails, standby controller 224 takes over the management of the storage array 102. When servers, also referred to herein as hosts, connect to the storage array 102, read/write requests (e.g., IO requests) are sent over network 256, and the storage array 102 stores the sent data or sends back the requested data to host 104.

Host 104 is a computing device including a CPU 250, memory (RAM) 246, permanent storage (HDD) 242, a NIC card 252, and an IO module 254. The host 104 includes one or more applications 236 executing on CPU 250, a host operating system 238, and a computer program storage array manager 240 that provides an interface for accessing storage array 102 to applications 236. Storage array manager 240 includes an initiator 244 and a storage OS interface program 248. When an IO operation is requested by one of the applications 236, the initiator 244 establishes a connection with storage array 102 in one of the supported formats (e.g., iSCSI, Fibre Channel, or any other protocol). The storage OS interface 248 provides console capabilities for managing the storage array 102 by communicating with the active controller 220 and the storage OS 206 executing therein. It should be understood, however, that specific implementations may utilize different modules, different protocols, different number of controllers, etc., while still being configured to execute or process operations taught and disclosed herein.

Figure 3A:
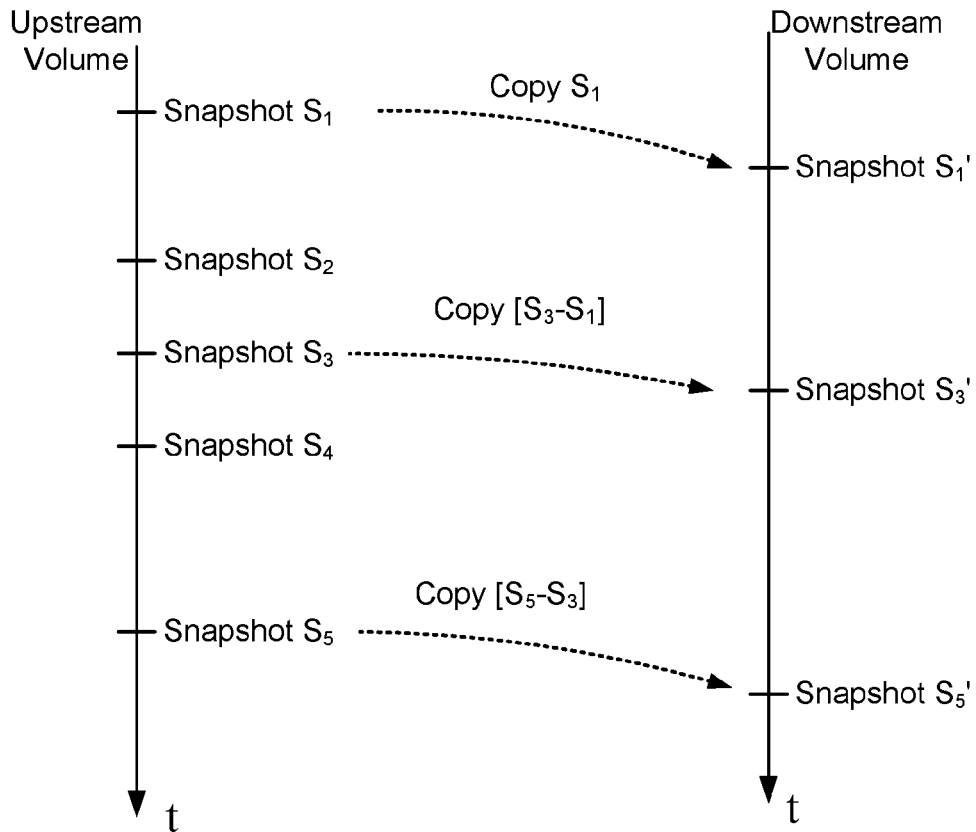
FIG. 3A illustrates the replication of the snapshots from one system to another, according to one embodiment.

FIG. 3A illustrates the replication of the snapshots from one system to another, according to one embodiment. In one embodiment, a volume is a single accessible storage area, reserved for one application or one host, or for a group of users of an organization or to segment/separate types of data for security or accessibly. In one embodiment, the data of the volume is divided into blocks, and the data from the volume is accessed by identifying a block (e.g., identifying an offset associated with the block being retrieved). That is, data from the volume is accessed by the host in units of a size of the block (e.g., one or more blocks), and the block is the smallest amount of data that can be requested from the volume.

In one embodiment, a first system creates snapshots of a volume over time (e.g., $S_1$, $S_2$, $S_3$, etc.). The volume replicates one or more of the snapshots to a second volume, for example to provide backup of the data in a different location or in a different storage array.

The storage array that holds the source data to be copied is referred to as the upstream storage array, or the upstream system, or the base storage array, and the storage array that receives a copy of the data is referred to as the downstream storage array or the downstream system. In one embodiment, volume replication is performed utilizing a method referred to as Snapshot Delta Replication (SDR), where only the difference between two snapshots, also referred to as the delta, is transmitted from the upstream to the downstream array. More details about SDR are described in U.S. patent application Ser. No. 14/950,456, entitled "Content-Based Replication of Data Between Storage Units," filed on Nov. 24, 2015, which is herein incorporated by reference.

When SDR is in the process of replicating a snapshot to another storage array, SDR calculates what blocks need to be transferred based on a common snapshot that is already present on the downstream as well as on the upstream. This common snapshot is also referred to as the common ancestor snapshot. After SDR is completed, the replicated snapshot is present on both the upstream and the downstream storage arrays.

In one embodiment, replication means copying all the data from the upstream volume to the downstream volume. In some embodiments, if the common ancestor snapshot of the volume has already been replicated, the replication of a later snapshot includes copying only the data that has changed, which is also referred to herein as the delta data or the difference between the two snapshots. It is noted that not all the snapshots in the upstream volume have to be replicated to the downstream volume.

For example, in the exemplary embodiment of FIG. 3A, the upstream volume has over time generated five snapshots, $S_1$, $S_2$, $S_3$, $S_4$, and $S_5$. The replication policy specifies that every other snapshot in the upstream volume is to be copied to the downstream volume. Therefore, the downstream volume has replicated snapshots $S_1'$, $S_3'$, and $S_5'$. As used herein, the snapshots with the apostrophe mark refer to the data in the downstream system.

Replicating snapshot $S_1$ requires copying all the data from $S_1$ to $S_1'$ because there are no previous snapshots that have been replicated. However, replicating snapshot $S_3$ requires only copying the difference between $S_3$ and $S_1$ [$S_3$-$S_1$]. In one embodiment, this method for replicating snapshots from the upstream to the downstream volume by copying the difference between two snapshots in time is referred to herein as snapshot delta replication (SDR).

Figure 3B:
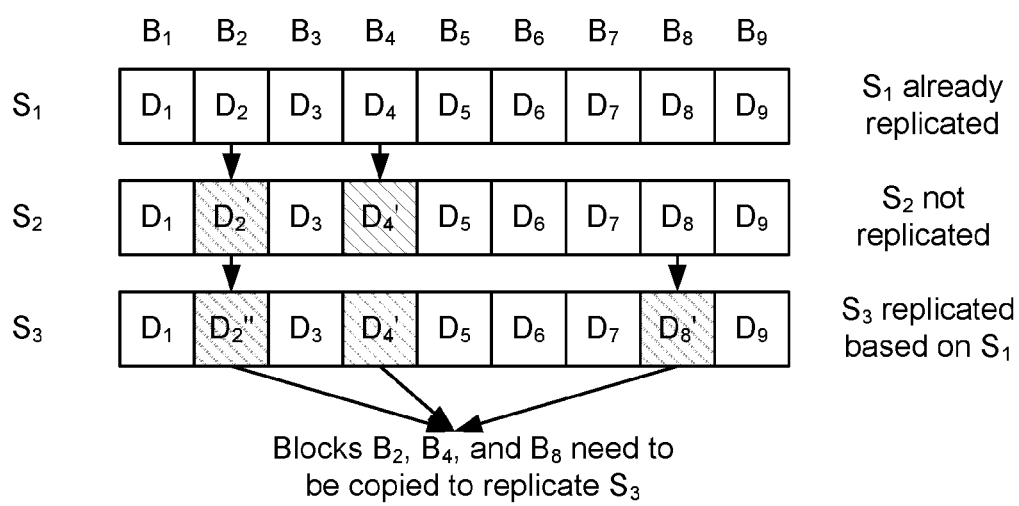
FIG. 3B illustrates which blocks are copied during replication, according to one embodiment.

FIG. 3B illustrates which blocks are copied during replication, according to one embodiment. FIG. 3B illustrates how snapshot $S_3$ is replicated based on base snapshot $S_1$ of volume V, where snapshot $S_1$ has already been replicated. After snapshot $S_1$ was taken, changes were made to the volume and then a second snapshot $S_2$ was taken. In the exemplary embodiment of FIG. 3B, block $B_2$ having data $D_2$ has been changed to $D_2'$, and block $B_4$ has changed from $D_4$ to $D_4'$. Snapshot $S_2$ has not been replicated.

After the creation of $S_2$, additional changes are made to the volume: block $B_2$ data has changed to $D_2''$ and data of block $B_8$ has changed from $D_8$ to $D_8'$. At this point snapshot $S_3$ is created and snapshot $S_3$ is to be replicated to a downstream storage array.

The replication of $S_3$ is based on the replicated snapshot of $S_1$, therefore, only the blocks that have changed between $S_3$ and $S_1$ have to be transmitted. These blocks are $B_2$ (having data $D_2''$), $B_4$ ($D_4'$), and $B_8$ ($D_8'$).

The system checks volume metadata to identify which blocks have changed between snapshots. After the blocks that have changed have been identified, the blocks are replicated. In one solution, the system reads the data from disk, even if the blocks were in the cache, because there is a low probability of finding the blocks in cache and because replication is considered a background task that doesn't impact performance very much. In another embodiment, the cache is checked for the data blocks being replicated before accessing disk, therefore, the replication of blocks that are in cache is faster.

Checking metadata is a processor-intensive operation because it requires traversing the structure of the volume. Due to this, replication for volumes with large nominal sizes may take a long time and consume a large amount of resources, even if there are few changes between snapshots.

In one embodiment, the metadata of the volume, including metadata of the snapshots of the volume, is pinned to cache, in order to accelerate the calculation of the delta between two snapshots (i.e., which blocks have changed between snapshots). The metadata being pinned in cache means that the metadata cannot be removed from cache (as long as it is pinned). In one embodiment, the metadata associated with a snapshot is unpinned after the snapshot has been completely replicated.

Figure 4:
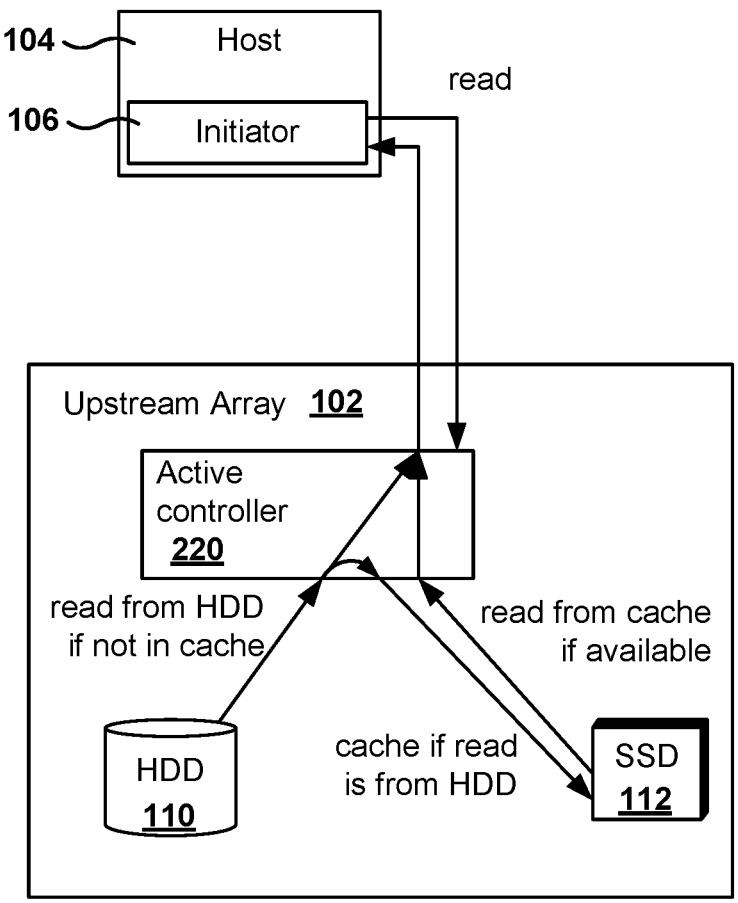
FIG. 4 illustrates the caching of data during a read operation, according to one embodiment.

FIG. 4 illustrates the caching of data during a read operation, according to one embodiment. After a read request is received from initiator 106 in host 104, the active controller 220 examines metadata for the volume to determine where the data is located for the read. If the data is available in cache (e.g., SSD 112), then the data is read from cache 112.

If the data is not available in cache 112, then the data is read from disk 110. Afterwards data read from disk is cached in cache 112. That is, after a cache miss, the data is read from disk and then cached during an IO operation. Finally, after the data is obtained from cache or disk, the data is sent back to initiator 106 to complete the read request 10 operation.

Figure 5:
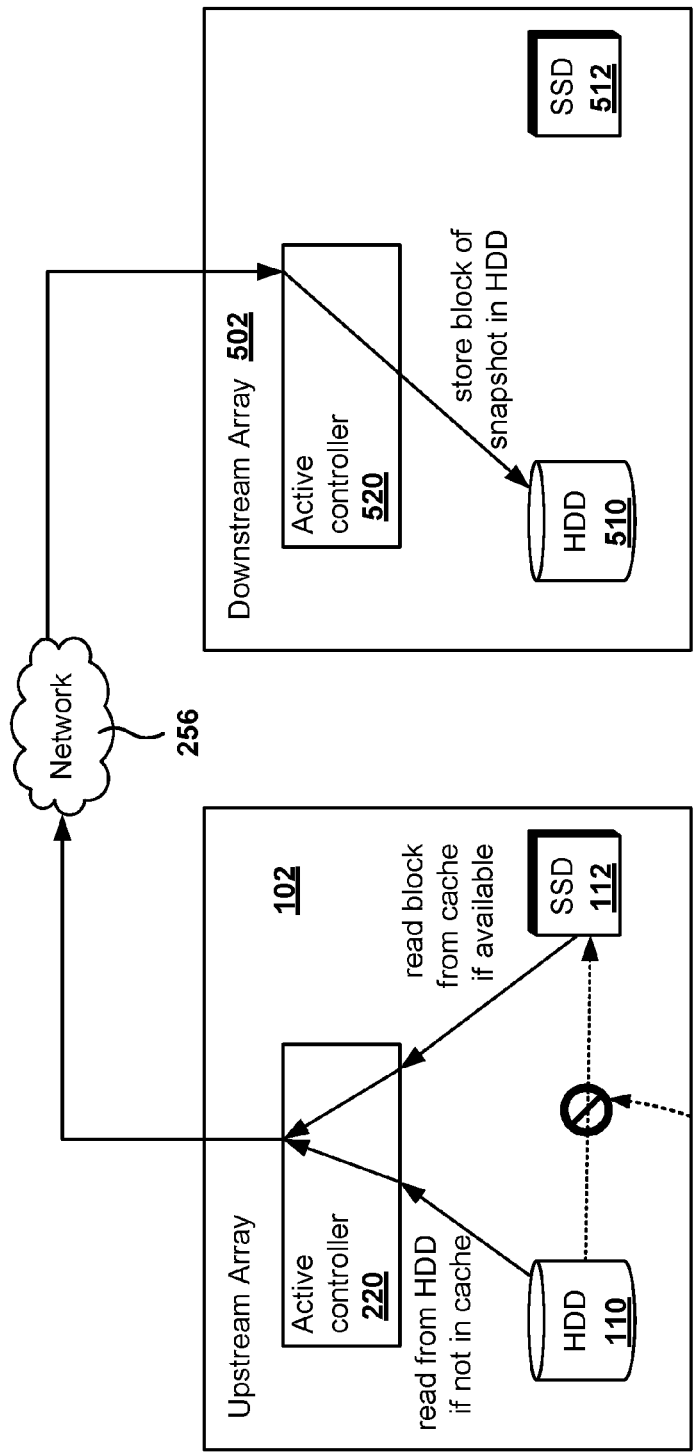
FIG. 5 illustrates the replication of a block from a first array to a second array, according to one embodiment.

FIG. 5 illustrates the replication of a block from a first array to a second array, according to one embodiment. During replication, the active controller 220 in the upstream array 102 keeps track of which blocks need to be transferred to the downstream array. In another embodiment, the active controller 520 in the downstream array keeps track of which blocks need to be transferred from the upstream array 102.

During replication, when a block needs to be transferred, active controller 220 checks the metadata of the volume to determine where the block is stored (e.g., cache 112 and/or disk 110). Then, the data is read from cache 112 or disk 110. However, unlike when performing a volume-read operation, if the data is read from disk 110 during replication, the data is not cached in cache 112 after the cache miss.

The replication operation is faster, because if the data is in cache, then the data is read from the cache. Other solutions do not access the cache in order to save time in accessing metadata to determine if the data is in cache.

Data from a snapshot is less likely to be accessed because the data may not be the current data of the volume, and data in snapshots tend to be accessed less often than the data from a volume. By not caching data during replication, the cache is not "polluted" with data having a low probability of being accessed. Therefore, the cache is more efficient because the cache holds data with higher probability of being accessed, and the more efficient cache will result in a more efficient storage system with better IO throughput.

Figure 6:
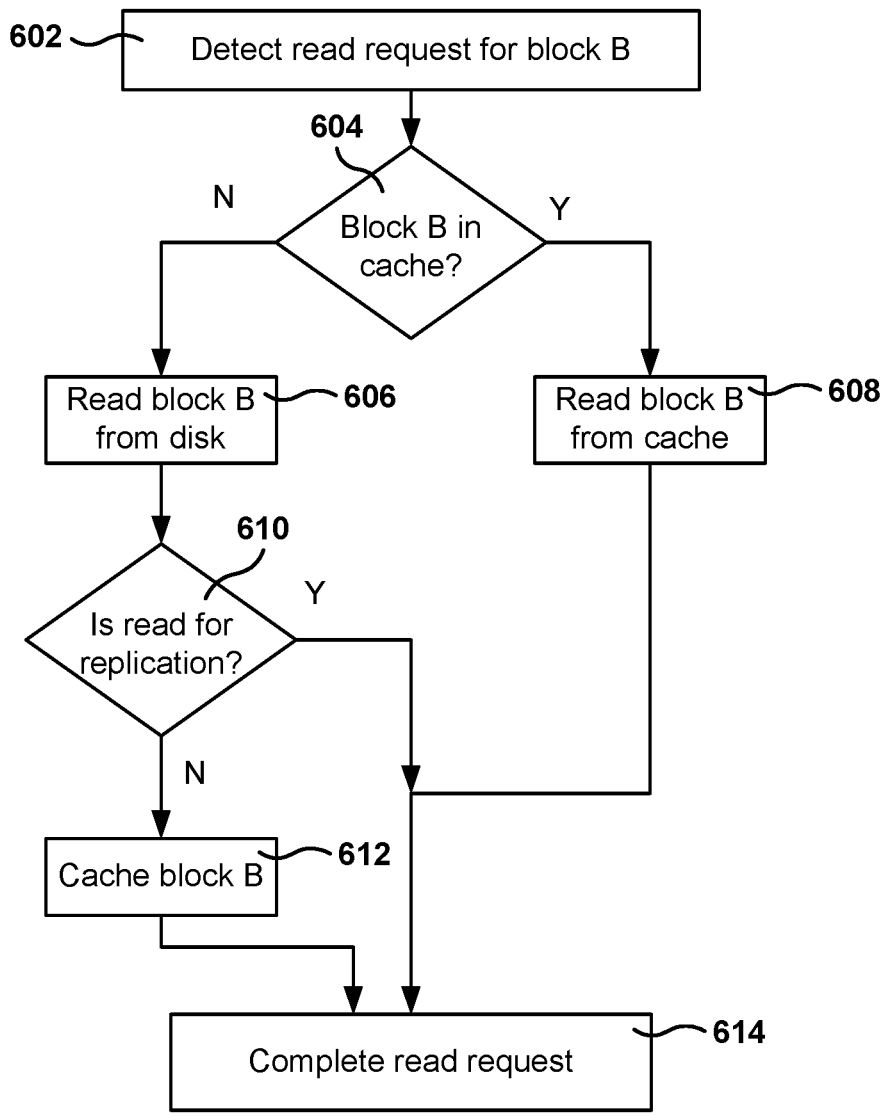
FIG. 6 is a flowchart of a method for managing memory space, according to one embodiment.

FIG. 6 is a flowchart of a method for managing memory space, according to one embodiment. While the various operations in this flowchart are presented and described sequentially, one of ordinary skill will appreciate that some or all of the operations may be executed in a different order, be combined or omitted, or be executed in parallel.

In operation 602, a read request is detected for block B. The read may be associated with an IO operation, or may be for replicating block B to another device, or for some other reason. From operation 602, the method flows to operation 604 where a check is made to determine if block B is stored in cache. If block B is stored in cache the method flows to operation 608, where block B is read from cache. If block B is not stored in cache, the method flows to operation 606, where block B is read from disk.

From operation 606, the method flows to operation 610 where a check is made to determine if the read is associated with the replication operation. If the read is for replication, the method flows to operation 614. If the read is not for replication, the method flows to operation 612, where the data from block B just read from disk is cached in the cache memory.

From operations 608 and 612, the method flows to operation 614, where the read request is completed, such as by sending the data back to an initiator (in an IO operation) or by sending the data to a downstream array for replication of the volume or snapshot containing block B.

Figure 7:
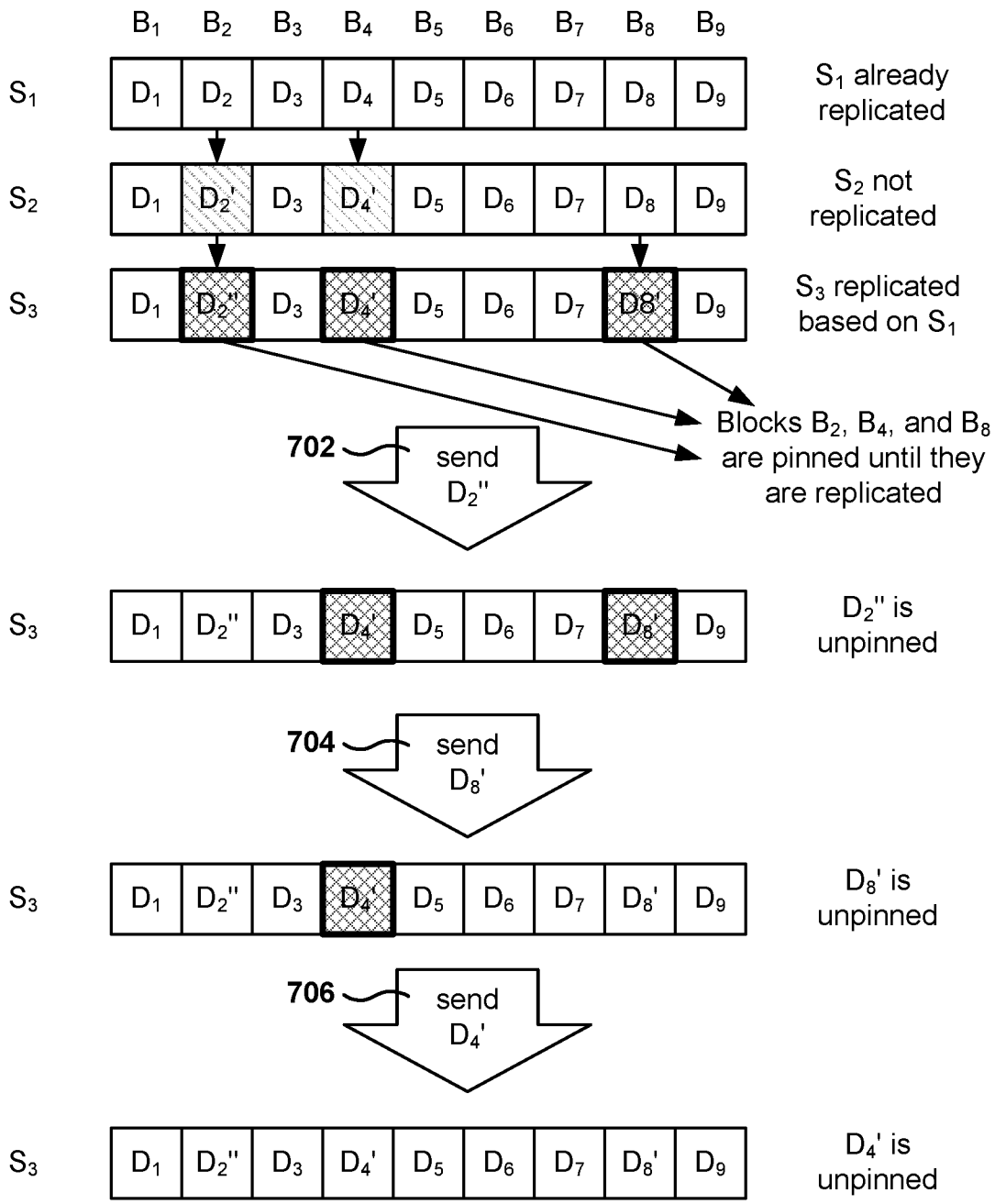
FIG. 7 illustrates the pinning of blocks in the snapshot during replication, according to one embodiment.

FIG. 7 illustrates the pinning of blocks in the snapshot during replication, according to one embodiment. In one embodiment, all the blocks of the snapshot to be transferred are pinned until the replication completes, while the blocks that are not to be transferred are not pinned. In another embodiment, all the blocks of the snapshots are pinned until replication is complete.

In general, when a volume is pinned, the storage array only pins the current version of the volume, that is, snapshots are not pinned because they are older versions of the volume. This is because the data from the snapshots may have already been replaced in the volume. However, in one embodiment, the pinning policy is changed to allow the pinning of snapshots that are in the process of being replicated.

In one embodiment, once the replication of the snapshot is complete, the snapshot is unpinned from cache (e.g., the SSD). In another embodiment, once a block of the snapshot has been replicated (e.g., transferred to the downstream array), the block is unpinned from cache, but other blocks from the snapshot waiting to be transferred continued to be pinned until transferred. In one embodiment, not all snapshots are pinned, and only the snapshots waiting to be replicated are pinned.

In the exemplary embodiment of FIG. 7, the snapshot replication described above with reference to FIG. 3 is detailed. As described above, blocks $B_2$, $B_4$ and $B_8$ need to be replicated and transferred to the downstream array. In one embodiment, blocks $B_2$, $B_4$ and $B_8$ are pinned, while the rest of the blocks of $S_3$ are not pinned because they don't have to be transferred.

Initially, data $D_2''$ of Block $B_2$ is transferred 702 to the downstream array. After $D_2''$ has been transferred, then $D_2''$ is unpinned from cache. Afterwards, data $D_8'$ of block $B_8$ is transferred 704. After the transfer, $D_8'$ is also unpinned from cache. Similarly, $D_4'$ is unpinned after being transferred to the downstream array.

Figure 8:
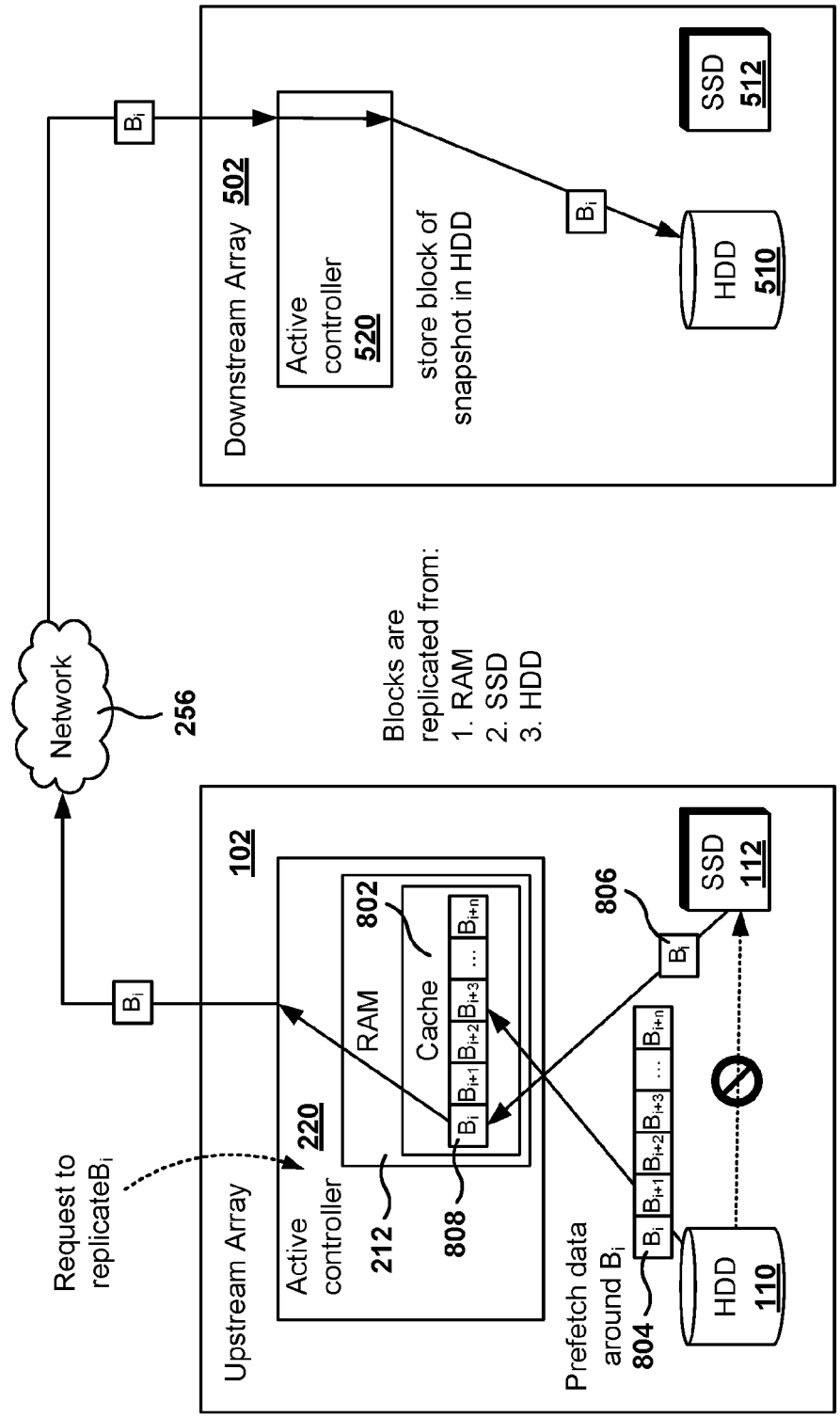
FIG. 8 illustrates the prefetching of data during replication, according to one embodiment.

FIG. 8 illustrates the prefetching of data during replication, according to one embodiment. In one embodiment, during replication the data is prefetched. This means that if a read is made for a block B, being replicated (i.e., to be transferred to a downstream array 502), the active controller reads block B, from cache 112 or from disk 110 before the block is transferred, but if the read is from disk, the active controller reads additional unsolicited data from disk and stores it in memory.

If there is a cache miss and the block has to be read from disk, the active controller reads the block plus a plurality of blocks following the requested block from disk. The data read from disk 808 is stored in a RAM cache 802, and the block B, is then transferred to the downstream array.

Later, if a request is made for another block (e.g., $B_{i+1}$) that is in the RAM cache, the active controller does not have to read the data from SSD cache 112 or disk 110. For example, if the block size is 4 kB, the prefetch operation will read 64 kB of data from disk, but other sizes of data prefetched are also possible.

If the blocks have been written sequentially, then the prefetch operation will be fast because the blocks would likely be stored sequentially on disk. This way, sequential data will be replicated fast as the number of access to disks is reduced.

Embodiments of the present disclosure may be practiced with various computer system configurations including hand-held devices, microprocessor systems, microprocessor-based or programmable consumer electronics, minicomputers, mainframe computers and the like. The embodiments can also be practiced in distributed computing environments where tasks are performed by remote processing devices that are linked through a network.

With the above embodiments in mind, it should be understood that the embodiments can employ various computer-implemented operations involving data stored in computer systems. These operations are those requiring physical manipulation of physical quantities. Any of the operations described herein are useful machine operations. The embodiments also relate to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

One or more embodiments can also be fabricated as computer readable code on a non-transitory computer readable storage medium. The non-transitory computer readable storage medium is any non-transitory data storage device that can store data, which can be thereafter be read by a computer system. Examples of the non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for managing memory utilization, the method comprising:
   detecting a read request for a data block of a volume in a first storage device, wherein the volume is stored in disk storage and cached in cache memory;
   reading the data block from the cache memory when the data block is stored in the cache memory;
   reading the data block from the disk storage when the data block is not stored in the cache memory;
   caching the data block read from the disk storage in the cache memory when the data block is not stored in the cache memory and the read request is not for replicating the data block to a second storage device, wherein the data block is not cached in the cache memory when replicating the data block;
   completing the read request, wherein the read request is a volume data read operation sent by a host device or the read request is associated with a replication of the volume to the second storage device, and replication of the volume to the second storage device includes replicating a snapshot of the volume from the first storage device to the second storage device, the replicating being of data blocks of the snapshot that have changed with reference to another snapshot previously replicated; and
   pinning in the cache memory the data blocks of the snapshot that have changed with reference to another snapshot previously replicated.

2. The method as recited in claim 1, wherein completing the read request includes:
   sending the data block to a host device when the read request is received from the host device; and
   sending the data block to the second storage device when the read request is for replicating the data block to the second storage device.

3. The method as recited in claim 1, further including:
   prefetching a plurality of data blocks when reading the data block from disk storage;
   storing the prefetched plurality of data blocks in a random access memory (RAM); and
   serving the prefetched plurality of data blocks from RAM when requested.

4. A network storage device comprising:
   a random access memory (RAM);
   disk storage for storing data of a volume;
   a cache memory for caching the data of the volume; and
   a processor, wherein the processor is configured to detect a read request for a data block of the volume, wherein the processor reads the data block from the cache memory when the data block is stored in the cache memory;
   wherein the processor reads the data block from the disk storage when the data block is not stored in the cache memory;
   wherein the processor caches the data block read from the disk storage in the cache memory when the data block is not stored in the cache memory and the read request is not for replicating the data block to another storage device, wherein the data block is not cached in the cache memory when replicating the data block;
   wherein the processor completes the read request after reading the data block from the cache memory or from the disk storage;
   wherein the read request is a volume data read operation sent by a host device or the read request is associated with a replication of the volume to the other storage device, the replication of the volume to the other storage device includes replicating a snapshot of the volume from the storage device to the another storage device and replicating is of data blocks of the snapshot that have changed with reference to another snapshot previously replicated, wherein the processor pins in the cache memory the data blocks of the snapshot that have changed with reference to another snapshot previously replicated.

5. The network storage device as recited in claim 4, wherein when completing the read request, the processor sends the data block to the host device when the read request is received from the host device, wherein the processor sends the data block to the other storage device when the read request is for replicating the data block to the other storage device.

6. The network storage device as recited in claim 4, when reading the data block from disk storage, the processor prefetches a plurality of data blocks and stores the prefetched plurality of data blocks in a random access memory (RAM), wherein the prefetched plurality of data blocks are served from RAM when requested.

7. A non-transitory computer-readable storage medium storing a computer program for managing memory utilization, the computer-readable storage medium comprising:
   program instructions for detecting a read request for a data block of a volume in a first storage device, wherein the volume is stored in disk storage and cached in cache memory;
   program instructions for reading the data block from the cache memory when the data block is stored in the cache memory;
   program instructions for reading the data block from the disk storage when the data block is not stored in the cache memory;
   program instructions for caching the data block read from the disk storage in the cache memory when the data block is not stored in the cache memory and the read request is not for replicating the data block to a second storage device, wherein the data block is not cached in the cache memory when replicating the data block;
   program instructions for completing the read request, wherein the read request is a volume data read operation sent by a host device or the read request is associated with a replication of the volume to the second storage device and the replication of the volume to the second storage device includes replicating a snapshot of the volume from the first storage device to the second storage device, the replication being of data blocks of the snapshot that have changed with reference to another snapshot previously replicated; and
   program instructions for pinning in the cache memory the data blocks of the snapshot that have changed with reference to another snapshot previously replicated.

8. The non-transitory computer-readable storage medium as recited in claim 7, wherein completing the read request includes:
   program instructions for sending the data block to a host device when the read request is received from the host device; and
   program instructions for sending the data block to the second storage device when the read request is for replicating the data block to the second storage device.

* * * * *